Dec. 29, 1942.   A. P. FOX ET AL   2,306,942
LUBRICATOR
Filed March 17, 1942   3 Sheets-Sheet 1

INVENTORS
Alex. P. Fox
Ludwin C. Rotter
BY Leonard L. Kalish
their Attorney

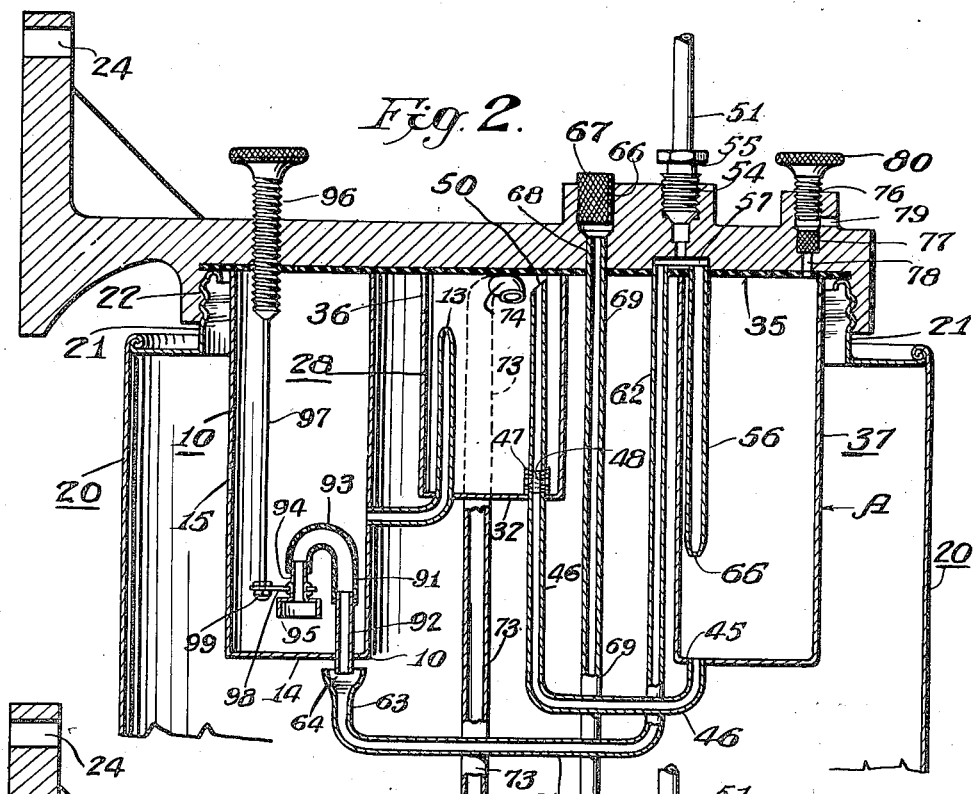

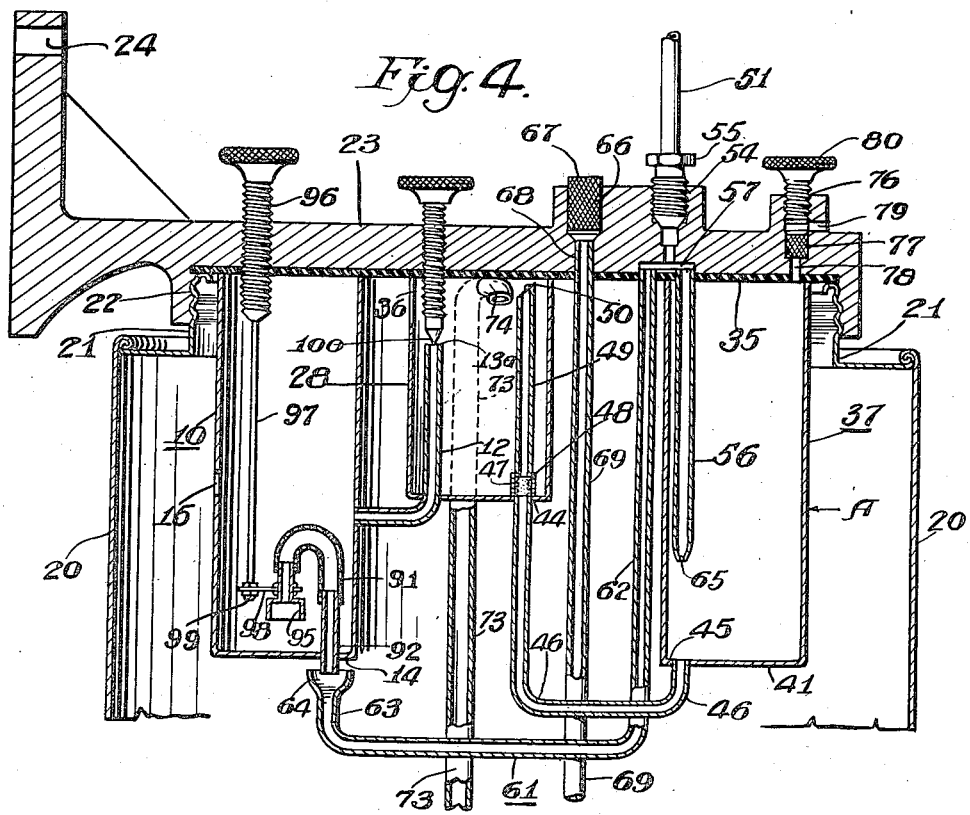

Patented Dec. 29, 1942

2,306,942

UNITED STATES PATENT OFFICE 2,306,942

LUBRICATOR

Alex P. Fox, University City, and Lutwin C. Rotter, Maplewood, Mo., assignors to Lincoln Engineering Company, St. Louis, Mo., a corporation of Missouri Application March 17, 1942, Serial No. 434,996

14 Claims. (Cl. 123—196)

The present invention relates to lubricators and it relates more particularly to lubricators adapted for upper-cylinder lubrication of internal combustion engines.

An object of the present invention is to provide a lubricator adapted for engine head and valve lubrication which will accomplish both lubrication and solvent treatment of the engine parts efficiently and in accordance with the need for such treatment.

Other objects and purposes of the present invention are apparent in the following specification, appended claims and accompanying drawings.

In the past, lubricators intended for upper-cylinder lubrication have been ineffective to supply lubricant in accordance with the exact needs of the engine parts for such lubrication.

Thus, certain lubricators have operated to deliver a continuous supply of upper-cylinder lubricant throughout engine operation. It has been found that such continuous supply is ordinarily not desirable and is, furthermore, extremely wasteful of lubricant since such continuous lubrication is not necessary, during normal operation.

Other old-type lubricators operate to supply a single charge of lubricant immediately upon the start of engine operation. A modification of this type delivers lubricant only after the engine has been stopped a predetermined period of time. This type of lubricator has the disadvantage of not furnishing lubricant during continued and prolonged operation of the engine during which some upper-cylinder lubrication is desirable.

Still another old-type lubricator operates to deliver intermittent charges of lubricant; the rate of such intermittent delivery depending upon engine operation. This type of lubricator has the disadvantage of not furnishing immediate lubrication upon the start of engine operation after a protracted stop; it being highly important to supply lubricant immediately upon restart of engine operation after such protracted stop.

The lubricator of the present invention functions, for the first time, to supply upper-cylinder lubricant in exact accordance with the needs of the engine. Thus the lubricator of the present invention operates to supply a single charge of lubricant immediately upon start of engine operation after the engine has been stopped for a predetermined period of time, the length of which may be varied. The lubricator of the present invention further operates to supply intermittent charges of lubricant thereafter; the intermittent delivery being governed by engine operation. The lubricator of the present invention, additionally, provides means for varying the size of, and interval between, such intermittent deliveries either dependently or independently of each other. Means are also provided whereby the lubricator of the present invention may be adjusted to deliver a continuous supply of lubricant where this is necessary or desirable.

With the above and other objects and advantages in view, the present invention comprises certain novel details and features of construction which will be fully brought out hereinbelow.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 2 represents a fragmentary cross-sectional view similar to Figure 1 showing a modified form of lubricator in which the intermittent delivery can be varied to provide either small and frequent intermittent charges or larger and less frequent charges.

Figure 3 represents a fragmentary cross-sectional view similar to Figure 2 but showing another modification in which the size of the intermittent deliveries is fixed while the period between such deliveries can be varied.

Figure 4 represents a fragmentary cross-sectional view similar to Figures 2 and 3 but showing still another modification in which the size of the intermittent deliveries and the period between deliveries can be varied independently of each other.

Figure 1:
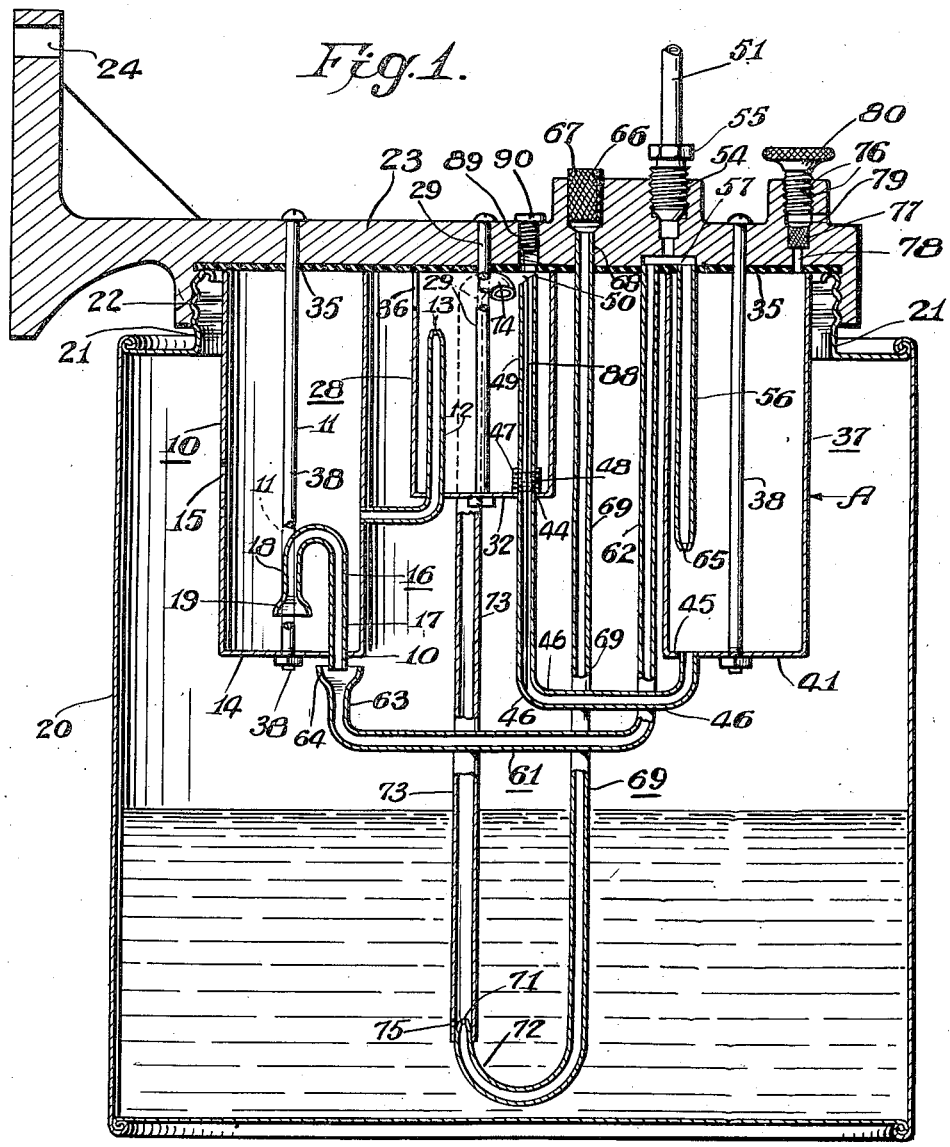
Figure 1 represents a vertical cross-sectional view of one embodiment of the present invention.

In one embodiment of the present invention illustrated in Figure 1, I may provide a container 20 which serves as a lubricant reservoir and which has an upper threaded neck 21. The neck 21 is adapted to be screwed into a threaded socket 22 of a head 23.

Said head 23 may be provided with one or more openings 24 whereby the lubricator may be bolted or otherwise fastened to any convenient point of the automobile, preferably to the wall separating the engine compartment from the operator's compartment.

A generally cylindrical feeding chamber 28 is supported within the upper most part of said container 20 from said head 23 by means of a bolt 29; the upper open end of said feeding chamber 28 being held in fluid-tight sealing relationship with a gasket 35 which is fitted within the socket 22.

An opening 36 is provided in the uppermost portion of said feeding chamber 28 to establish communication between said feeding chamber 28 and said container 20.

A generally cylindrical supply chamber 37 is suspended within said container 20 from said head 23 by means of a bolt 38; the upper open end of said supply chamber 37 being held in fluid-tight sealing relationship with said gasket 35. The supply chamber 37 extends downwardly within said container 20 a predetermined distance below the feeding chamber 28.

An opening 44 is provided in the bottom wall 32 of the feeding chamber 28 and an opening 45 is provided in the bottom wall 41 of the supply chamber 37. A tube 46 connects the openings 44 and 45.

An apertured collar 47 is provided within the feeding chamber 28 directly above and surrounding the opening 44. A suitable filter 48, which may be a wire-mesh or felt screen or which may be any other conventional construction, is provided within the said apertured collar 47. A tube 49 extends upwardly from the upper portion of said collar 47 and is open at its upper end 50 which is positioned at the uppermost portion of said feeding chamber 28.

A generally cylindrical siphon chamber 10 is supported within said container 20 from the head 23 by means of a bolt 11; the upper open end of said siphon chamber 10 being held in fluid-tight sealing relationship with said gasket 35. The siphon chamber 10 extends downwardly an appreciable distance beyond the feeding chamber 28.

A stand-pipe 12 connects the feeding chamber 28 with the siphon chamber 10; the upper open end 13 thereof being somewhat below the vent opening 36 in the feeding chamber 28 while the lower end of said stand-pipe 12 connects with the siphon chamber 10 slightly below the bottom wall 32 of said feeding chamber 28 but substantially above the bottom wall 14 of the siphon chamber 10.

A vent opening 15 is provided in said siphon chamber 10 somewhat above the point of entry of the stand-pipe 12.

A siphon, designated generally by the numeral 16, is disposed within the lower portion of said siphon chamber 10 and is provided with a long or discharge arm 17, which extends through the bottom wall 14 of said siphon chamber 10, and a short or intake arm, the lower end of which terminates somewhat above the bottom wall 14 of the siphon chamber 10.

The lowermost tip 19 of the intake arm 18 is flared or otherwise cross-sectionally enlarged; the function of such enlarged tip being hereinafter described.

A conduit 51 is connected, at one end, to the intake manifold or to some other convenient point in the suction passage-way of the engine and, at its other end, to a threaded socket 54 in the head 23 by means of a threaded collar 55.

A tube 56 extends downwardly from the head 23 within the supply chamber 37 and terminates at a predetermined position above the bottom wall 41 of the supply chamber 37 but below the bottom wall 32 of the feeding chamber 28. The tube 56 has a restricted opening 65 at its lower end. The upper end of said tube 56 communicates, through connecting passage-ways 57 in the head 23, with the socket 54 and the discharge conduit 51. A J-shaped tube extends downwardly within said container 20 from said head 23. The upper open end of the long arm 62 of said J-shaped tube 61 also communicates, through the connecting passage-ways 57 in the head 23, with the socket 54 and the discharge conduit 51.

The upwardly-extending short arm 63 of the J-shaped tube 61 is disposed directly below the discharge arm 17 of the siphon 16 and communicates with the container 20. The uppermost tip 64 of said short arm 63 is somewhat flared to receive the lowermost end of said discharge arm 17 and to maintain a clearance therewith.

A socket 66 is provided within the upper portion of said head 23 and contains suitable filtering material 67. A vertical opening 68 extends downwardly through said head 23 from said socket 66.

A J-shaped tube 69, forming the air-intake of an air-lift, extends downwardly from the passage-way 68 to the bottom of the container 20; a restricted opening 71 being provided at the end of the upwardly-extending short arm 72 of said tube 69.

A riser pipe 73 is fitted about the upper end of the arm 72 and extends upward therefrom to the top of said container 20; the uppermost portion of said tube 73 being bent downwardly as at 74 and extending within the uppermost portion of said feeding chamber 28. One or more small openings 75 are provided in the lower end of the riser pipe 73 at a point adjacent the opening 71 in the arm 72 of the air-intake tube 69.

An internally threaded socket 76 is provided upon the upper side of the head 23 and suitable filtering material 77 is disposed within the lowermost portion of said socket 76. A passage-way 78 extends downwardly through said head 23 from said socket 76 and communicates with the supply chamber 37. A vent passage-way 79 extends through the socket 76.

An externally threaded flow regulator valve 80 is screw-threadedly disposed within said socket 76 and is adapted to open or close the vent 79 and thereby either to establish or to cut off communication between the supply chamber 37 and the atmosphere.

The operation of the embodiment shown in Figure 1 will now be described. When the flow regulator valve 80 is in its closed position so that the supply chamber 37 is cut off from the atmosphere, the lubricator shown in Figure 1 will operate continuously to supply lubricant throughout engine operation. Suction from the intake manifold is transmitted through the conduit 51 and the J-shaped tube 61 to the container 20. As the air pressure within the container 20 drops, air is sucked, through the socket 66 and the filtering material 67, into the air-inlet tube 69 and to the short arm 72 thereof; the lower end of said air-inlet tube 69 being below the level of lubricant in the container 20. The air escaping through the restricted opening 71 in the short arm 72 rises rapidly within the riser pipe 73 and carries with its slugs of lubricant which are drawn in through the openings 75 at the lower end of said riser pipe 73. Thus, as the engine operates, the vacuum or suction transmitted to the container 20 operates the air-lift whereby lubricant is transferred from the lower portion of the container 20 up to the feeding chamber 28. The lubricant within the feeding chamber 28 drains, through the apertured collar 47, the filter 48, the opening 45 and the tube 46 into the lower portion of the supply chamber 37. When the level of lubricant within the supply chamber 37 reaches the opening 65 at the lower end of the tube 56, which is also in communication with the conduit 51, lubricant is sucked through the tube 56 and the conduit 51 into the intake manifold from where it is carried to the cylinder with the entering air. Thereafter, lubricant will be supplied to the intake manifold continuously, so long as the engine is in operation. When the engine is stopped, the supply chamber 37 will contain lubricant up to the height of the opening 65. Thus, after the initial operation of the lubricator, lubricant will be supplied immediately upon start of engine operation and will continue uninterruptedly throughout such operation while the flow-control valve 80 is closed.

Assuming that the lubricator is in the condition last described, namely that the engine is stopped and that the supply chamber 37 contains lubricant up to or slightly below the level of the opening 65, the operation of the lubricator will now be described upon opening of the flow-control valve 80.

As the engine is started, the suction will be transmitted through the conduit 51 and the tube 61 to the container 20 and to the feeding chamber 28 through the opening 36 therein. Thus the feeding chamber 28 will have an air pressure substantially below atmospheric pressure. The suction is also transmitted from the conduit 51, through the tube 56 and the opening 55 to the supply chamber 37. However, due to the fact that the flow-control valve 80 is open, air enters the supply chamber 37 and the pressure therein remains substantially at, or only slightly below, atmospheric pressure. Thus, the air pressure above the lubricant in the supply chamber 37 is greater than the air pressure in the feeding chamber 28. As a result, the lubricant in the lower portion of the supply chamber 37 is blown backward through the tubes 46 and 49 into the feeding chamber 28.

It can be seen that, so long as the flow-control valve 80 is open, the higher air pressure in the supply chamber 37 will prevent the lubricant from draining into said supply chamber 37 from the feeding chamber 28. Thus, so long as the flow-control valve 80 is open, no lubricant will be supplied to the conduit 51 from the supply chamber 37.

However, when the lubricant in the feeding chamber 28 is, as above described, prevented from leaving the feeding chamber 28 through the apertured collar 47, the level of lubricant in said feeding chamber 28 rises, due to operation of the air-lift, until it is above the open upper end 13 of the stand-pipe 12.

Thereafter, lubricant will drain continuously through the open upper end 13 and the stand-pipe 12 into the siphon chamber 10. The level of lubricant in said siphon chamber 10 will rise until it is above the bend of the siphon 16 whereupon a siphoning operation will occur. The siphon will continue to operate to remove lubricant from the siphon chamber 10 until the level of lubricant therein drops below the lowermost end of the intake arm 18 of the siphon 16, whereupon the siphon will be broken. The lubricant thus siphoned from the siphon chamber 10 will be delivered to the tube 61 through which it is sucked up into the conduit 51 and into the intake manifold.

After the siphon has been broken, the level of lubricant in the siphon chamber 10 again gradually rises as additional lubricant is introduced through the stand pipe 12 until the siphon again operates.

Thus, when the flow-control valve 80 is open, intermittent charges of lubricant will be delivered to the intake manifold through the action of the siphon 16, so long as the engine is operated.

When the engine is stopped after a period of operation with the flow-control valve 80 open, the pressure within the container 20 and the feeding chamber 28 return to atmospheric pressure so that there is no longer any difference in air pressure in the feeding chamber 28 and the supply chamber 37. Thus, there is no back pressure to keep the lubricant up within the feeding chamber 28 and, therefore, all the lubricant in said feeding chamber 28 drains down through the apertured collar 47, the opening 45 and the tube 46 into the supply chamber 37. The sizes of the feeding chamber 28 and the supply chamber 37 are so proportioned that the volume of lubricant thus draining from the feeding chamber 28 (the lubricant draining fully from the level of the upper end 13 of the stand-pipe 12 to the supply chamber 37 is sufficient to fill said supply chamber to the level A which is substantially above the opening 65 in the tube 56.

Upon a subsequent re-starting of engine operation, lubricant will be sucked through the opening 65 and the tube 56 into the conduit 51 and the intake manifold immediately. Such initial addition of lubricant will continue until the lubricant level within the supply chamber 37 drops from the level A to just below the opening 65 in the tube 56. Thereafter, the air entering through the open flow-control valve 80 will blow the remaining lubricant from the supply chamber 37 back into the feeding chamber 28 as before. After the initial addition of lubricant has been completed, subsequent intermittent charges of lubricant will be delivered by the action of the siphon 16 as hereinabove described.

It is, therefore, clear that, with the flow-control valve 80 open, the lubricator of the present invention will operate to supply a single charge of lubricant immediately upon the start of engine operation when such lubricant is most needed and will thereafter supply intermittent charges of lubricant depending upon the length of engine operation.

By employing a collar 47 having sufficiently small apertures, it is possible to lengthen the time required for the lubricant to drain from the feeding chamber 28 to the supply chamber 37 after the engine is stopped. Thus a collar may be employed which requires, for example, thirty minutes for the lubricant to drain into the supply chamber 37 up to the level of the opening 65 and sixty minutes for the lubricant to drain fully into the supply chamber 37 up to the level A.

In such case, if the engine were stopped, for less than thirty minutes, and were then re-started, no initial charge of lubricant would be delivered since the lubricant within the supply chamber 37 would be below the level of the opening 65 and would be blown back into the feeding chamber 28.

This feature is desirable since an engine which is stopped for only a short time does not require any initial charge of lubricant upon re-starting.

If the engine had been stopped for forty-five minutes, for example, the collar 47 would have permitted lubricant to drain into the supply chamber 37 to a height intermediate the level A and the opening 65. In such case, an initial charge of lubricant would be delivered upon re-starting which is less than the full charge. If the engine had been stopped for one hour or more, the apertured collar 47 would have permitted all the lubricant to drain from the feeding chamber 28 into the supply chamber 37 up to the level A thereof, in which case a full initial supply of lubricant would be delivered upon re-starting of the engine.

It is possible to use interchangeable collars 47 having different-sized apertures so that the drainage time can be varied.

It is also possible to employ a timing wire 88 which may be inserted in the tubes 49 and 46 by removing the plug 90 which is screw-threadedly disposed within the opening 89 in the head 23 directly above the upper open end 50 of the tube 49. The timing wire 88 partially restricts the passage and retards the drainage of lubricant from the feeding chamber 28 to the supply chamber 37. By employing a plurality of different-diametered timing wires, it is again possible to vary the drainage time.

The intake arm 18 of the siphon 16 is provided with the cross-sectionally enlarged tip 19 at the lowermost end thereof in order to provide more effective operation of the siphon when viscous liquids are employed. It has been found that, when the intake arm 18 has a small bore throughout its length, liquids having high viscosity tend to become entrapped in the siphon at the end of a siphoning operation; slugs of liquid remaining in the siphon after the siphoning operation is completed. If this occurs, the siphon 16 is not completely freed of liquid and, when the level of liquid in the siphon chamber 10 again begins to rise, the upward pressure thus exerted on the intake arm 18 tends to force the retained slugs of liquid upward and to re-start the siphoning action before the lubricant level in the siphon chamber 10 has reached the normal siphon-starting level, that is, the level of the bend of the siphon 16. By providing the arm 18 with the cross-sectionally enlarged tip 19, this premature re-starting of the siphoning operation is prevented; the additional weight of liquid contained in the cross-sectionally enlarged tip 19 being sufficient completely to urge the intake arm 18 of liquid when the siphoning operation is completed, that is, when the level of liquid in the siphon chamber 10 drops below the lowermost end of the intake arm 18. Thus no slugs of liquid are retained in the siphon 16 and there can be no premature re-starting of the siphoning operation.

In place of the siphon 16 shown in Figure 1 in which merely the lowermost tip of the intake arm is cross-sectionally enlarged, it is possible to employ the siphon 16—a shown in Figure 3 in which the intake arm 18—a is cross-sectionally enlarged throughout its entire length.

It is preferred, when shifting from continuous to intermittent operation of the lubricator, that is when shifting from the closed to the open position of the flow-control valve 80, to make such shift during a period of engine operation rather than when the engine is stopped. In this way, the feeding chamber 28 will contain lubricant when the engine is finally stopped and, by drainage of the lubricant into the supply chamber 37, an initial supply of lubricant will be delivered to the intake manifold upon re-starting of the engine. Thus, there will be no initial period of operation-without-lubrication as would occur if the change from continuous to intermittent operation were made at a time when the engine was stopped as hereinabove described at page 3, lines 33–66.

In Figure 2, there is shown a modified form of the lubricator of the present invention in which the siphon can be adjusted to deliver either small and frequent charges of lubricant or larger and less frequent charges of lubricant to the intake manifold when the flow-control valve 80 is open.

The siphon 91 of Figure 2 includes a rigid tube 92 passing through the bottom wall 14 and affixed thereto. Flexible tubing 93 of rubber or the like extends upwardly from the rigid tube 92 and is reversibly bent with a smaller length of rigid tubing 94 extending downwardly therefrom; said length of tubing 94 having a cross-sectionally enlarged tip 95 at the lowermost end thereof. The enlarged tip 95 is generally cylindrical in cross-section as distinguished from the funnel-shaped tip 19 shown in Figure 1.

An adjusting bolt 96 passes through the head 23 and is vertically adjustable therethrough. A stem 97 extends downwardly from the bolt 96 within the siphon chamber 10 and passes through a yoke 98 which is affixed to the tubing 94. The yoke 98 is loosely fitted about the stem 97 and is retained thereon by an enlarged head 99 thereof.

When the adjusting bolt 96 is screwed upwardly, the tubing 94 is also moved upwardly; the stem 97 rotating within the yoke 98. The flexible tubing 93 adjusts itself accordingly and, thus, the intake arm of the siphon is made shorter. When the intake arm is thus shortened, the amount of lubricant delivered during each siphoning operation, is, of course, smaller and, since it requires less time to accumulate the smaller charge between siphoning operations, the siphoning operations are more frequent.

When the adjusting bolt 96 is screwed downward, the intake arm becomes longer and the amount of lubricant delivered during each siphoning operation is greater; the time between siphoning operations becoming correspondingly longer.

Another modification of the present invention is shown in Figure 3 which employs a fixed and non-adjustable siphon tube 16—a. In the embodiment shown in Figure 3, a needle valve 100 is screw-threadedly mounted through the head 23 and is adapted to vary the rate of flow of lubricant from the feeding chamber 28 through the opening 13—a in the stand-pipe 12—a.

By adjusting the needle valve 100, it is possible to regulate the time required for lubricant to drain into the siphon chamber 10 to re-start the siphoning operation.

Thus the lubricator shown in Figure 3 will deliver fixed charges of lubricant to the intake manifold at adjustable intervals, during engine operation, when the flow-control valve 80 is open.

Another modification of the present invention is shown in Figure 4 in which are provided an adjustable length siphon 91 similar to that of Figure 2 and also a needle valve 100 similar to that of Figure 3.

It is apparent that, by regulation of the adjusting bolt 96 and the needle valve 100, it is possible to provide universal regulation of the intermittent delivery of the lubricator. Thus, it is possible to deliver small charges of lubricant at short intervals by raising the adjusting bolt 96 and opening the needle valve 100. It is possible to deliver small charges of lubricant at longer intervals by leaving the adjusting bolt 96 raised and by throttling or partially closing the needle valve 100.

By lowering the adjusting bolt 96 and fully opening the needle valve 100 it is possible to deliver large charges of lubricant at frequent intervals while, of course, by partially closing the needle valve 100, such large charges will be delivered at longer intervals.

From the above discussion of the operation of the lubricator of the present invention, it is apparent that upper-cylinder lubrication can be regulated in exact accordance with the needs of the engine under the particular conditions of operation and with the wishes of the operator. Thus, maximum efficiency and economy are attained.

The novel lubricator of the present invention is adapted for use on internal combustion engines of automobiles, internal combustion engines of aircraft, marine engines, stationary engines, portable engines, etc., and provides a relatively simple, inexpensive and compact unit which is easy to install and dependable in operation and which contributes greatly to the life and efficiency of the engine.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

The invention having thus been described, what is hereby claimed to be new and desired to be secured by Letters Patent is:

1. An engine lubricator of the character described including a lubricant reservoir, a feeding chamber, means for transferring lubricant from said reservoir to said feeding chamber, a supply chamber having an air-inlet valve, gravity-controlled means for transferring lubricant from a lower portion of said feeding chamber to a lower portion of said supply chamber, a siphon chamber having a siphon therein, gravity-controlled means for transferring lubricant from an upper portion of said feeding chamber to said siphon chamber, a delivery line into which said siphon discharges and through which the lubricant so discharged is transferred by suction to the engine, and a delivery line through which lubricant is drawn from an upper portion of said supply chamber and transferred by suction to the engine.

2. An engine lubricator of the character described including a lubricant reservoir, a feeding chamber, a suction-operated air-lift for transferring lubricant from said reservoir to said feeding chamber, a supply chamber having an air-inlet valve, gravity-controlled means for transferring lubricant from a lower portion of said feeding chamber to a lower portion of said supply chamber, a siphon chamber having a siphon therein, gravity-controlled means for transferring lubricant from an upper portion of said feeding chamber to said siphon chamber, a delivery conduit adapted to transfer lubricant from said lubricator to said engine by engine-created suction, means for transmitting said suction more or less uniformly to said reservoir, to said feeding chamber, and to said siphon chamber, a supply line adapted to transfer lubricant from said siphon to said delivery conduit, and a supply line adapted to transfer lubricant from an upper portion of said supply chamber to said delivery conduit.

3. An engine lubricator of the character described including a lubricant reservoir having a supply of lubricant in the lower portion thereof, a removable head closing said reservoir, a feeding chamber supported within the uppermost portion of said reservoir from said head, a suction-operated air-lift adapted to transfer lubricant from said reservoir to said feeding chamber, a supply chamber supported within said reservoir from said head and having an air-inlet valve, said supply chamber extending downwardly within said reservoir beyond said feeding chamber, a tube connecting the lower portion of said feeding chamber to the lower portion of said supply chamber, a siphon chamber supported within said reservoir from said head, said siphon chamber extending downwardly within said reservoir beyond said feeding chamber, a siphon operatively disposed within the lower portion of said siphon chamber and having its discharge arm passing through the wall of said siphon chamber, a tube connecting the upper portion of said feeding chamber to said siphon chamber, a suction-operated delivery conduit adapted to transfer lubricant from said lubricator to the engine, means for transmitting engine-created suction more or less uniformly to said reservoir, to said feeding chamber and to said siphon chamber, a delivery tube adapted to receive lubricant from the discharge end of said siphon and to transfer said lubricant to the delivery conduit by engine-created suction, and a suction-operated tube adapted to draw lubricant from an upper portion of said supply chamber and to deliver said lubricant to said delivery conduit.

4. An engine lubricator of the character described including a feeding chamber, a supply chamber having an air-inlet valve, gravity-controlled means for transferring lubricant from a lower portion of said feeding chamber to a lower portion of said supply chamber, a siphon chamber having a siphon therein, gravity-controlled means for transferring lubricant from an upper portion of said feeding chamber to said siphon chamber, a delivery line into which said siphon discharges and through which the lubricant so discharged is transferred by suction to the engine, and a delivery line through which lubricant is drawn from an upper portion of said supply chamber and transferred by suction to the engine.

5. An engine lubricator of the character described including a feeding chamber, a primary supply chamber having an air-inlet valve, means for transferring lubricant from a lower portion of said feeding chamber to a lower portion of said primary supply chamber, a secondary supply chamber, means for transferring lubricant from an upper portion of said feeding chamber to said secondary supply chamber, a delivery conduit adapted to carry lubricant by suction from said lubricator to the engine, means for transferring lubricant from an upper portion of said primary supply chamber to said delivery conduit, and means for transferring intermittent charges of lubricant from said secondary supply chamber to said delivery conduit.

6. An engine lubricator of the character described including a feeding chamber, a primary supply chamber having an air-inlet valve, means for transferring lubricant from a lower portion of said feeding chamber to a lower portion of said primary supply chamber, a secondary supply chamber, means for transferring lubricant from an upper portion of said feeding chamber to said secondary supply chamber, a delivery conduit adapted to carry lubricant by suction from said lubricator to the engine, means for transferring lubricant from an upper portion of said primary supply chamber to said delivery conduit, and means for transferring intermittent charges of lubricant from said secondary supply chamber to said delivery conduit, said last-mentioned transfer means being operable only when the transfer means from said primary supply chamber is non-operable.

7. An engine lubricator of the character described including a feeding chamber, a primary supply chamber, gravity-controlled means for transferring lubricant from said feeding chamber to said primary supply chamber when said chambers are at more or less approximately the same air-pressure, means for evacuating each of said chambers, means for increasing the pressure in said primary supply chamber above the pressure in said feeding chamber whereby the gravity-controlled transfer means therebetween is non-operable, a delivery conduit adapted to carry lubricant from said lubricator by suction to the engine, means for transferring lubricant from said primary supply chamber to said delivery conduit only when said primary supply chamber contains lubricant above a predetermined level, a secondary supply chamber, gravity-controlled means for transferring lubricant from said feeding chamber to said secondary supply chamber, said last-mentioned gravity-controlled transfer means being operable only when said first-mentioned gravity-controlled transfer means is non-operable, and means for delivering intermittent charges of lubricant from said secondary supply chamber to said delivery conduit.

8. An engine lubricator of the character described including an uppermost feeding chamber, a primary supply chamber extending downward substantially beyond said feeding chamber, a tube connecting the lower portion of said feeding chamber and the lower portion of said primary supply chamber, whereby lubricant drains from said feeding chamber to said primary supply chamber when said chambers are at more or less approximately the same air-pressure, means for evacuating said chambers, an air-inlet valve connected to said primary supply chamber whereby the pressure in said evacuated primary supply chamber may be increased sufficiently to prevent drainage of lubricant from said feeding chamber to said primary supply chamber through said connecting tube, a delivery conduit adapted to carry lubricant by suction from said lubricator to the engine, means for transferring lubricant from said primary supply chamber to said delivery conduit only when said primary supply chamber contains lubricant above a predetermined level, a siphon chamber extending downwardly substantially beyond said feeding chamber and having a siphon therein, a line connecting an upper portion of said feeding chamber and said siphon chamber whereby lubricant is transferred to said siphon chamber only when there is no drainage of lubricant from said feeding chamber to said primary supply chamber, and a delivery line into which said siphon intermittently discharges the lubricant in said siphon chamber and through which the lubricant so discharged is transferred to said delivery conduit.

9. An engine lubricator of the character described including an uppermost feeding chamber, a primary supply chamber extending downward substantially beyond said feeding chamber, a tube connecting the lower portion of said feeding chamber and the lower portion of said primary supply chamber, whereby lubricant drains from said feeding chamber to said primary supply chamber when said chambers are at more or less approximately the same air-pressure, constricting means operative to retard the rate of drainage of lubricant through said tube, means for evacuating said chambers, an air-inlet valve connected to said primary supply chamber whereby the pressure in the evacuated primary supply chamber may be increased sufficiently to prevent drainage of lubricant from said feeding chamber to said primary supply chamber through said connecting tube, a delivery conduit adapted to carry lubricant by suction from said lubricator to the engine, means for transferring lubricant from said primary supply chamber to said delivery conduit only when said primary supply chamber contains lubricant above a predetermined level, a siphon chamber extending downwardly substantially beyond said feeding chamber and having a siphon therein, a line connecting an upper portion of said feeding chamber and said siphon chamber whereby lubricant is transferred to said siphon chamber only when there is no drainage of lubricant from said feeding chamber to said primary supply chamber, and a delivery line into which said siphon intermittently discharges the lubricant in said siphon chamber and through which the lubricant so discharged is transferred to said delivery conduit.

10. An engine lubricator of the character described including an uppermost feeding chamber, a primary supply chamber extending downward substantially beyond said feeding chamber, a tube connecting the lower portion of said feeding chamber and the lower portion of said primary supply chamber, whereby lubricant drains from said feeding chamber to said primary supply chamber when said chambers are at more or less approximately the same air-pressure, means for evacuating said chambers, an air-inlet valve connected to said primary supply chamber whereby the pressure in the evacuated primary supply chamber may be increased sufficiently to prevent drainage of lubricant from said feeding chamber to said primary supply chamber through said connecting tube, a delivery conduit adapted to carry lubricant by suction from said lubricator to the engine, means for transferring lubricant from said primary supply chamber to said delivery conduit only when said primary supply chamber contains lubricant above a predetermined level, a siphon chamber extending downward substantially beyond said feeding chamber and having a siphon therein, said siphon being adjustable to vary the lengths of its intake arm and its discharge arm, means for adjusting said siphon, a line connecting an upper portion of said feeding chamber and said siphon chamber whereby lubricant is transferred to said siphon chamber only when there is no drainage of lubricant from said feeding chamber to said primary supply chamber, and a delivery line into which said siphon intermittently discharges the lubricant in said siphon chamber and through which the lubricant so discharged is transferred to said delivery conduit.

11. An engine lubricator of the character described including an uppermost feeding chamber, a primary supply chamber extending downward substantially beyond said feeding chamber, a tube connecting the lower portion of said feeding chamber and the lower portion of said primary supply chamber, whereby lubricant drains from said feeding chamber to said primary supply chamber when said chambers are at more or less approximately the same air-pressure, means for evacuating said chambers, an air-inlet valve connected to said primary supply chamber whereby the pressure in the evacuated primary supply chamber may be increased sufficiently to prevent drainage of lubricant from said feeding chamber to said primary supply chamber through said connecting tube, a delivery conduit adapted to carry lubricant by suction from said lubricator to the engine, means for transferring lubricant from said primary supply chamber to said delivery conduit only when said primary supply chamber contains lubricant above a predetermined level, a siphon chamber extending downward substantially beyond said feeding chamber and having a siphon therein, a line connecting an upper portion of said feeding chamber and said siphon chamber whereby lubricant is transferred to said siphon chamber only when there is no drainage of lubricant from said feeding chamber to said primary supply chamber, valve means operatively connected to said line whereby the rate of drainage of lubricant therethrough can be varied, and a delivery line into which said siphon intermittently discharges the lubricant in said siphon chamber and through which the lubricant so discharged is transferred to said delivery conduit.

12. An engine lubricator of the character described including an uppermost feeding chamber, a primary supply chamber extending downward substantially beyond said feeding chamber, a tube connecting the lower portion of said feeding chamber and the lower portion of said primary supply chamber, whereby lubricant drains from said feeding chamber to said primary supply chamber when said chambers are at more or less approximately the same air-pressure, means for evacuating said chambers, an air-inlet valve connected to said primary supply chamber whereby the pressure in the evacuated primary supply chamber may be increased sufficiently to prevent drainage of lubricant from said feeding chamber to said primary supply chamber through said connecting tube, a delivery conduit adapted to carry lubricant by suction from said lubricator to the engine, means for transferring lubricant from said primary supply chamber to said delivery conduit only when said primary supply chamber contains lubricant above a predetermined level, a siphon chamber extending downward substantially beyond said feeding chamber and having a siphon therein, said siphon being adjustable to vary the lengths of its intake arm and its discharge arm, a line connecting an upper portion of said feeding chamber and said siphon chamber whereby lubricant is transferred to said siphon chamber only when there is no drainage of lubricant from said feeding chamber to said primary supply chamber, valve means operatively connected to said line whereby the rate of drainage of lubricant therethrough can be varied, and a delivery line into which said siphon intermittently discharges the lubricant in said siphon chamber and through which the lubricant so discharged is transferred to said delivery conduit.

13. An engine lubricator of the character described including a feeding chamber, a primary supply chamber, gravity-controlled means for transferring lubricant from said feeding chamber to said primary supply chamber when said chambers are at more or less approximately the same air-pressure, means for evacuating each of said chambers, means for increasing the pressure in the evacuated primary supply chamber above the pressure in said feeding chamber whereby the gravity-controlled transfer means therebetween is non-operable, a delivery conduit adapted to carry lubricant from said lubricator by suction to the engine, means for transferring lubricant from said primary supply chamber to said delivery conduit only when said primary supply chamber contains lubricant above a predetermined level, a secondary supply chamber, gravity-controlled means for transferring lubricant from said feeding chamber to said secondary supply chamber, said last-mentioned gravity-controlled transfer means being operable only when said first-mentioned gravity-controlled transfer means is non-operable, means for delivering intermittent charges of lubricant from said secondary supply chamber to said delivery conduit, and means for varying the size of said intermittent charges and the interval between said intermittent charges independently of each other.

14. An engine lubricator of the character described including a feeding chamber, a supply chamber having an air-inlet valve, gravity-controlled means for transferring lubricant from a lower portion of said feeding chamber to a lower portion of said supply chamber, a siphon chamber having a siphon therein, said siphon having at least a portion of its intake arm substantially cross-sectionally enlarged, gravity-controlled means for transferring lubricant from an upper portion of said feeding chamber to said siphon chamber, a delivery line into which said siphon discharges and through which the lubricant so discharged is transferred by suction to the engine, and a delivery line through which lubricant is drawn from an upper portion of said supply chamber and transferred by suction to the engine.

ALEX P. FOX.
LUTWIN C. ROTTER.